US008060644B1

(12) United States Patent
Michailidis et al.

(10) Patent No.: US 8,060,644 B1
(45) Date of Patent: Nov. 15, 2011

(54) INTELLIGENT NETWORK ADAPTOR WITH END-TO-END FLOW CONTROL

(75) Inventors: Dimitrios Michailidis, Sunnyvale, CA (US); Wael Noureddine, Mountain View, CA (US); Felix A. Marti, San Francisco, CA (US); Asgeir Thor Eiriksson, Sunnyvale, CA (US)

(73) Assignee: Chelsio Communications, Inc., Sunnyvale, CA (US)

( * ) Notice: Subject to any disclaimer, the term of this patent is extended or adjusted under 35 U.S.C. 154(b) by 1084 days.

(21) Appl. No.: 11/747,673

(22) Filed: May 11, 2007

(51) Int. Cl.
*G06F 15/16* (2006.01)

(52) U.S. Cl. ......... 709/234; 709/228; 709/232; 709/235

(58) Field of Classification Search ........................ None
See application file for complete search history.

(56) References Cited

U.S. PATENT DOCUMENTS

| | | | | |
|---|---|---|---|---|
| 4,445,116 | A | 4/1984 | Grow | |
| 4,533,996 | A | 8/1985 | Hartung et al. | |
| 5,497,476 | A | 3/1996 | Oldfield et al. | |
| 5,778,189 | A | 7/1998 | Kimura et al. | |
| 6,087,581 | A | 7/2000 | Emmer et al. | |
| 6,226,680 | B1 | 5/2001 | Boucher et al. | 709/230 |
| 6,240,094 | B1 | 5/2001 | Schneider | |
| 6,247,060 | B1 | 6/2001 | Boucher et al. | 709/238 |
| 6,334,153 | B2 | 12/2001 | Boucher et al. | 709/230 |
| 6,389,479 | B1 | 5/2002 | Boucher et al. | 709/243 |
| 6,393,487 | B2 | 5/2002 | Boucher et al. | 709/238 |
| 6,397,316 | B2 | 5/2002 | Fesas, Jr. | |
| 6,401,177 | B1 | 6/2002 | Koike | |
| 6,427,171 | B1 | 7/2002 | Craft et al. | 709/230 |
| 6,427,173 | B1 | 7/2002 | Boucher et al. | 709/238 |
| 6,434,620 | B1 | 8/2002 | Boucher et al. | 709/230 |
| 6,460,080 | B1 * | 10/2002 | Shah et al. | 709/224 |
| 6,470,415 | B1 | 10/2002 | Starr et al. | 711/104 |
| 6,510,164 | B1 | 1/2003 | Ramaswamy et al. | |
| 6,564,267 | B1 * | 5/2003 | Lindsay | 709/250 |
| 6,591,302 | B2 | 7/2003 | Boucher et al. | 709/230 |
| 6,594,268 | B1 | 7/2003 | Aukia et al. | |
| 6,625,671 | B1 | 9/2003 | Collette et al. | |
| 6,658,480 | B2 | 12/2003 | Boucher et al. | 709/239 |
| 6,681,244 | B1 | 1/2004 | Cross et al. | |
| 6,687,758 | B2 | 2/2004 | Craft et al. | 709/250 |

(Continued)

OTHER PUBLICATIONS

Clark et al., "*An Analysis of TCP Processing Overhead*," IEEE Communications Magazine, Jun. 1989, pp. 23-29.

(Continued)

*Primary Examiner* — David England
(74) *Attorney, Agent, or Firm* — Beyer Law Group LLP

(57) ABSTRACT

A host is coupled to a network via an intelligent network adaptor. The host is executing an application configured to receive application data from a peer via the network and the intelligent network adaptor using a stateful connection according to a connection-oriented protocol. The intelligent network adaptor performs protocol processing of the connection. Application data is copied from host memory not configured for access by the application (possibly OS-associated host memory) to host memory associated with the application (application-associated host memory). The application data is received from the peer by the intelligent network adaptor and copied to host memory not configured for access by the application. The operating system selectively provides, to the intelligent network adaptor, information of the memory associated with the application. At least one portion of the application data for the connection is provided directly from the intelligent network adaptor to the memory associated with the application.

14 Claims, 4 Drawing Sheets

U.S. PATENT DOCUMENTS 6,697,868 B2 2/2004 Craft et al. .................... 709/230
6,701,372 B2 3/2004 Yano et al.
6,708,223 B1 3/2004 Wang et al.
6,708,232 B2 3/2004 Obara
6,717,946 B1 4/2004 Hariguchi et al.
6,751,665 B2 6/2004 Philbrick et al. .............. 709/224
6,757,245 B1 6/2004 Kuusinen et al.
6,757,746 B2 6/2004 Boucher et al. ............... 709/250
6,792,502 B1 9/2004 Pandya et al.
6,798,743 B1 9/2004 Ma et al.
6,807,581 B1 10/2004 Starr et al. .................... 709/250
6,813,652 B2 11/2004 Stadler et al.
6,862,648 B2 3/2005 Yatziv
6,907,042 B1 * 6/2005 Oguchi ......................... 370/412
6,925,055 B1 8/2005 Erimli et al.
6,938,092 B2 8/2005 Burns ........................... 709/230
6,941,386 B2 9/2005 Craft et al. .................... 709/250
6,965,941 B2 11/2005 Boucher et al. ............... 709/230
6,996,070 B2 * 2/2006 Starr et al. .................... 370/252
7,031,267 B2 4/2006 Krumel
7,042,898 B2 5/2006 Blightman et al. ........... 370/463
7,076,568 B2 7/2006 Philbrick et al. .............. 709/250
7,089,289 B1 * 8/2006 Blackmore et al. ........... 709/212
7,089,326 B2 8/2006 Boucher et al. ............... 709/242
7,093,099 B2 8/2006 Bodas et al. .................. 711/206
7,114,096 B2 9/2006 Freimuth et al.
7,124,205 B2 10/2006 Craft et al. .................... 709/250
7,133,902 B2 11/2006 Saha et al.
7,133,914 B1 11/2006 Holbrook
7,133,940 B2 11/2006 Blightman et al. ............. 710/22
7,164,656 B2 1/2007 Foster et al.
7,167,926 B1 1/2007 Boucher et al. ............... 709/250
7,167,927 B2 1/2007 Philbrick et al. .............. 709/250
7,174,393 B2 2/2007 Boucher et al. ............... 709/250
7,185,266 B2 2/2007 Blightman et al. ........... 714/776
7,191,241 B2 3/2007 Boucher et al. ............... 709/230
7,191,318 B2 3/2007 Tripathy et al. ............... 712/225
7,239,642 B1 7/2007 Chinn et al.
7,254,637 B2 8/2007 Pinkerton et al.
7,260,631 B1 8/2007 Johnson et al.
7,284,047 B2 10/2007 Barham et al.
7,313,623 B2 12/2007 Elzur et al.
7,320,042 B2 * 1/2008 Trainin ........................... 710/52
7,346,701 B2 * 3/2008 Elzur et al. .................... 709/232
7,376,147 B2 5/2008 Seto et al.
7,408,906 B2 8/2008 Griswold et al.
7,453,892 B2 11/2008 Buskirk et al.
7,457,845 B2 * 11/2008 Fan et al. ...................... 709/213
7,474,670 B2 1/2009 Nowshadi
7,493,427 B2 2/2009 Freimuth et al.
7,533,176 B2 5/2009 Freimuth et al.
7,583,596 B1 9/2009 Frink
7,594,002 B1 * 9/2009 Thorpe et al. ................. 709/219
7,609,696 B2 10/2009 Guygyi et al.
7,616,563 B1 * 11/2009 Eiriksson et al. ............. 370/230
7,826,350 B1 * 11/2010 Michailidis et al. .......... 370/229
7,844,742 B2 * 11/2010 Pope et al. .................... 709/250
7,869,355 B2 * 1/2011 Kodama et al. ............... 370/230
7,929,540 B2 * 4/2011 Elzur ........................... 370/394
2001/0010046 A1 7/2001 Muyres et al.
2001/0021949 A1 9/2001 Blightman et al. ........... 709/219
2002/0039366 A1 4/2002 Sano
2002/0191622 A1 12/2002 Zdan
2003/0005164 A1 * 1/2003 Trainin ......................... 709/250
2003/0018516 A1 1/2003 Ayala et al.
2003/0035436 A1 2/2003 Denecheau et al.
2003/0046330 A1 3/2003 Hayes
2003/0158906 A1 8/2003 Hayes
2003/0200284 A1 10/2003 Philbrick et al. .............. 709/219
2003/0204631 A1 10/2003 Pinkerton et al.
2004/0003094 A1 1/2004 See
2004/0019689 A1 1/2004 Fan
2004/0028069 A1 2/2004 Tindal et al.
2004/0030745 A1 2/2004 Boucher et al. ............... 709/203
2004/0042487 A1 3/2004 Ossman
2004/0054813 A1 3/2004 Boucher et al. ............... 709/250
2004/0062245 A1 4/2004 Sharp et al. ................... 370/392
2004/0062246 A1 4/2004 Boucher et al. ............... 370/392
2004/0064578 A1 4/2004 Boucher et al. ............... 709/236
2004/0064590 A1 4/2004 Starr et al. .................... 709/250
2004/0073703 A1 * 4/2004 Boucher et al. ............... 709/245
2004/0078480 A1 4/2004 Boucher et al. ............... 709/237
2004/0088262 A1 5/2004 Boucher et al. ................. 705/65
2004/0100952 A1 5/2004 Boucher et al. ............... 370/389
2004/0111535 A1 6/2004 Boucher et al. ............... 709/250
2004/0117509 A1 6/2004 Craft et al.
2004/0158640 A1 * 8/2004 Philbrick et al. .............. 709/230
2004/0165592 A1 8/2004 Chen et al.
2004/0190533 A1 9/2004 Modi et al.
2004/0199808 A1 10/2004 Freimuth et al.
2004/0213235 A1 10/2004 Marshall et al.
2004/0240435 A1 12/2004 Craft et al. .................... 709/250
2005/0071490 A1 3/2005 Craft et al. .................... 709/230
2005/0083850 A1 * 4/2005 Sin et al. ....................... 370/252
2005/0083935 A1 4/2005 Kounavis et al.
2005/0120037 A1 6/2005 Maruyama et al.
2005/0125195 A1 6/2005 Brendel
2005/0135378 A1 6/2005 Rabie et al.
2005/0135396 A1 6/2005 McDaniel et al.
2005/0135412 A1 6/2005 Fan
2005/0147126 A1 7/2005 Qiu et al.
2005/0190787 A1 9/2005 Kuik et al.
2005/0216597 A1 9/2005 Shah et al.
2005/0259644 A1 11/2005 Huitema et al.
2005/0259678 A1 11/2005 Gaur
2005/0289246 A1 12/2005 Easton et al.
2006/0031524 A1 2/2006 Freimuth
2006/0039413 A1 2/2006 Nakajima et al.
2006/0075119 A1 * 4/2006 Hussain et al. ............... 709/227
2006/0080733 A1 4/2006 Khosmood et al.
2006/0133267 A1 6/2006 Alex et al.
2006/0168649 A1 7/2006 Venkat et al.
2006/0206300 A1 9/2006 Garg et al.
2006/0209693 A1 9/2006 Davari et al.
2006/0221946 A1 10/2006 Shalev et al.
2006/0235977 A1 10/2006 Wunderlich et al.
2006/0281451 A1 12/2006 Zur
2007/0011358 A1 1/2007 Wiegert et al.
2007/0033301 A1 * 2/2007 Aloni et al. ..................... 710/22
2007/0064737 A1 3/2007 Williams
2007/0070901 A1 3/2007 Aloni et al.
2007/0083638 A1 4/2007 Pinkerton et al.
2007/0086480 A1 * 4/2007 Elzur ........................... 370/463
2007/0110436 A1 5/2007 Bennett
2007/0201474 A1 8/2007 Isobe
2008/0002731 A1 1/2008 Tripathy et al.
2008/0016511 A1 1/2008 Hyder et al.
2008/0043750 A1 2/2008 Keels et al.
2008/0089347 A1 * 4/2008 Phillipi et al. ................ 370/400
2008/0232386 A1 9/2008 Gorti et al.
2009/0073884 A1 * 3/2009 Kodama et al. ............... 370/235
2009/0222564 A1 * 9/2009 Freimuth et al. .............. 709/228
2010/0023626 A1 * 1/2010 Hussain et al. ............... 709/227
2010/0235465 A1 * 9/2010 Thorpe et al. ................. 709/217

OTHER PUBLICATIONS

Woodside et al., "*The Protocol Bypass Concept for High Speed OSI Data Transfer*," Research Paper. Available at:http://citeseer.ist.psu.edu/cache/papers/cs/26104/http:zSzzSzwww.sce.carleton.cazSzftpzSzpubzSzcmwzSzbpjan90.pdf/woodside90protocol.pdf.

Rütsche et al., "*TCP/IP on the Parallel Protocol Engine*," High Performace Networking, (IV, C-14), Elsevier Science Publishers, B.V. North Holland 1993.

Thia et al., "*High-Speed OSI Protocol Bypass Algorithm with Window Flow Control*," IFIP WG6.4 Third International Workshop on Protocols for High-Speed Networks, Stockholm, Sweden, May 13-15, 1992, pp. 53-68.

Thia et al., "*A Reduced Operation Protocol Engine (ROPE) for a Multiple-Layer Bypass Architecture*," Protocols for High-Speed Networks IV, 4th IFIP International Workshop, Aug. 10-12, 1994, Vancouver, B.C., Canada, pp. 224-239.

Rütsche et al., "*Architectures of Multimedia Communication Subsystems*," IFIP Transactions; vol. C-23 archive, Proceedings of the IFIP TC6 International Conference on Information Networks and Data Communication table of contents, pp. 217-230, Year of Publication: 1994.

Dalton et al., "*Afterburner: Architectural Support for High-Performance Protocols*," http://www.hpl.hp.com/techreports/93/HPL-93-46.pdf, Jul. 1993, 18 Pages.
TRM Technologies, Inc., "*L4/L7 Switching*," Downloaded from http://www.trm.ca/pages/t-tech7.html on Feb. 16, 2006, 3 Pages.
Madsen et al., "*Wireless Data Communication*," Fall 2003 Presentation, Wireless Networks Division (WING), Allborg University.
Yocum et al., "*Anypoint: Extensible Transport Switching on the Edge*," Proceedings of the 4th USENIX Symposium on Internet Technologies and Systems, Mar. 26-28, 2003, Seattle, WA, USA.
International Search Report in PCT/US02/12679, dated Jul. 23, 2002.
Office Action in U.S. Appl. No. 10/474,500, mailed Oct. 4, 2007.
Office Action in U.S. Appl. No. 11/137,146, mailed Mar. 5, 2008.
Office Action in U.S. Appl. No. 11/137,140, mailed Feb. 5, 2008.
Office Action in U.S. Appl. No. 11/250,894, mailed Jun. 26, 2008.
Notice of Allowance in U.S. Appl. No. 10/474,500, mailed Jul. 1, 2008.
Allowed Claims from U.S. Appl. No. 10/474,500.
Office Action in U.S. Appl. No. 11/217,661, mailed Sep. 18, 2008.
Office Action in U.S. Appl. No. 11/313,003, mailed Aug. 22, 2008.
Office Action in U.S. Appl. No. 11/330,898, mailed Oct. 8, 2008.
Office Action in U.S. Appl. No. 11/137,146, mailed Nov. 3, 2008.
Office Action in U.S. Appl. No. 11/356,850 mailed Dec. 3, 2008.
U.S. Appl. No. 60/690,465, filed Jun. 14, 2005.
U.S. Appl. No. 60/718,418, filed Sep. 19, 2005.
Office Action in U.S. Appl. No. 11/282,933 mailed Feb. 20, 2009.
Office Action in U.S. Appl. No. 11/250,894 mailed Jan. 26, 2009.
Office Action in U.S. Appl. No. 11/137,140 mailed Mar. 31, 2009.
Office Action in U.S. Appl. No. 11/130,898 mailed Apr. 2, 2009.
Office Action in U.S. Appl. No. 11/747,790 mailed May 12, 2009.
Office Action in U.S. Appl. No. 11/747,793 mailed Jun. 8, 2009.
Notice of Allowance in U.S. Appl. No. 11/313,003, mailed Jun. 8, 2008.
Allowed Claims from U.S. Appl. No. 11/313,003.
Office Action in U.S. Appl. No. 11/217,661 mailed Jun. 9, 2009.
Pratt, Ian and Fraser, Keir, "Arsenic: A User-Accessible Gigabit Ethernet Interface," INFOCOM 2001. Twentieth Annual Joint Conference of the IEEE Computer and Communications Societies. Proceedings. IEEE, vol. 1, Issue , 2001 pp. 67-76 vol. 1.
Office Action in U.S. Appl. No. 11/137,146, mailed Jun. 23, 2009.
Office Action in U.S. Appl. No. 11/735,861, mailed Aug. 6, 2009.
Office Action in U.S. Appl. No. 11/137,140, mailed Aug. 21, 2009.
Office Action in U.S. Appl. No. 11/747,650, mailed Aug. 27, 2009.
Office Action in U.S. Appl. No. 11/250,894, mailed Sep. 15, 2009.
Notice of Allowance in U.S. Appl. No. 11/356,850, mailed Jun. 26, 2009.
Allowed Claims from U.S. Appl. No. 11/356,850.
Office Action in U.S. Appl. No. 11/282,933, mailed Sep. 9, 2009.
Notice of Allowance in U.S. Appl. No. 11/330,898, mailed Sep. 23, 2009.
Allowed Claims in U.S. Appl. No. 11/330,898.
Final Office Action in U.S. Appl. No. 11/747,790, mailed Nov. 5, 2009.
Notice of Allowance in U.S. Appl. No. 11/217,661 mailed Jan. 11, 2010.
Allowed Claims from U.S. Appl. No. 11/217,661.
Notice of Allowance in U.S. Appl. No. 11/282,933 mailed Dec. 31, 2009.
Allowed Claims from U.S. Appl. No. 11/282,933.
Office Action in U.S. Appl. No. 11/747,793, mailed Jan. 25, 2010.
Office Action in U.S. Appl. No. 11/735,861, mailed Jan. 25, 2010.
Office Action in U.S. Appl. No. 12/122,570, mailed Feb. 4, 2010.
Office Action in U.S. Appl. No. 11/137,146, mailed Feb. 4, 2010.
Office Action in U.S. Appl. No. 11/747,790, mailed Mar. 9, 2010.
Notice of Allowance in U.S. Appl. No. 11/250,894, mailed Mar. 29, 2010.
Allowed Claims from U.S. Appl. No. 11/250,894.
Office Action in U.S. Appl. No. 11/747,650, mailed Apr. 15, 2010.
Notice of Allowance in U.S. Appl. No. 11/137,140, mailed Jun. 30, 2010.
Notice of Allowance in U.S. Appl. No. 12/122,570, mailed Jul. 8, 2010.
Notice of Allowance in U.S. Appl. No. 11/747,650, mailed Jul. 8, 2010.
Final Office Action in U.S. Appl. No. 11/747,793, mailed Jul. 23, 2010.

* cited by examiner

INTELLIGENT NETWORK ADAPTOR WITH END-TO-END FLOW CONTROL

CROSS REFERENCE TO RELATED APPLICATIONS

This application is related to the following U.S. Non-Provisional Applications: application Ser. No. 11/747,650, By: Dimitrios Michaelidis, Wael Noureddine, Felix Marti and Asgeir Eiriksson, Entitled "INTELLIGENT NETWORK ADAPTOR WITH ADAPTIVE DIRECT DATA PLACEMENT SCHEME"; application Ser. No. 11/747,790, By: Dimitrios Michaelidis, Wael Noureddine, Felix Marti and Asgeir Eiriksson, Entitled "PROTOCOL OFFLOAD IN INTELLIGENT NETWORK ADAPTOR, INCLUDING APPLICATION LEVEL SIGNALLING"; and application Ser. No. 11/747,793, By: Dimitrios Michaelidis, Wael Noureddine, Felix Marti and Asgeir Eiriksson, Entitled "INTELLIGENT NETWORK ADAPTOR WITH DDP OF OUT-OF-ORDER SEGMENTS"; all of which are filed concurrently herewith and are incorporated by reference herein in their entirety for all purposes.

TECHNICAL FIELD

The present invention relates to efficient receive data communication using an intelligent network adaptor.

BACKGROUND

High speed communications over packet-based networks can place a heavy burden on end-host resources.

A host may typically be connected to a network using at least one network adaptor. The network adaptor receives packets from the network that are destined for the host. The network adaptor causes the packets to be placed in host memory buffers associated with the operating system. When one or more packets have been placed, the adaptor notifies the host processor of this event, typically using an interrupt. The packets are then processed by the host operating system, including delivering application payload data of the packets from the operating system buffers to buffers of a destination application corresponding to the packets.

Each application data bearing packet received from the network includes the application data, encapsulated within a stack of headers according to a network communication stack. For example, the network communication may be via TCP/IP over Ethernet. In this case, the TCP/IP stack encapsulates application data in a TCP header, and the TCP encapsulated data are encapsulated in an IP header. The TCP/IP encapsulated data are encapsulated in a header according to a local area network technology protocol, such as Ethernet.

In the high-speed communications environment, there are several challenges for end-host resources. One challenge is the high packet arrival rate, which implies a high associated interrupt rate as the host is notified of the arrival of each packet. Another challenge is associated with the memory bandwidth resources to copy application payload data from the operating system buffers to application buffers. Yet another challenge is to achieve low communication latency between the network and the host via the network adaptor, such that application payload received from the network by the network adaptor is provided in a relatively expedient manner to the application.

The present invention in some aspects may be directed to one or more of these challenges identified above to result in high speed and low latency communication with reduced demands on host processing and memory resources.

The challenges of high-speed communications have led to enhancements to network adaptor capabilities, resulting in so-called "Intelligent Network Adaptors" that, for example, offload some or all network communication protocol processing. In addition, direct data placement (DDP) is known. It refers to the capability of some intelligent network adaptors to process network packets arriving from the network and place payload data contained within the network packets directly into pre-determined locations in host memory.

SUMMARY

An intelligent network adaptor couples a host to a network. The host is executing an application configured to receive application data from a peer via the network and the intelligent network adaptor using a stateful connection between the host and the peer according to a connection-oriented protocol. The intelligent network adaptor performs protocol processing of the connection, including providing a receive window to the peer. The intelligent network adaptor places application data, received from the peer via the stateful connection, from memory of the intelligent network adaptor to host memory. The intelligent network adaptor receives, from the host, an indication of consumption of the application data from application buffers of the host memory. The intelligent network adaptor generates the receive window based at least in part on the received indications of consumption of the application data from the application buffers of the host memory.

DETAILED DESCRIPTION

The inventors have realized that a destination in a host for application data of payload packets protocol processed by a network adaptor, may be selected, and such selection may contribute to improved overall performance of communication of application payload data from the network, via the network adaptor, to the application executing in the host.

Figure 1:
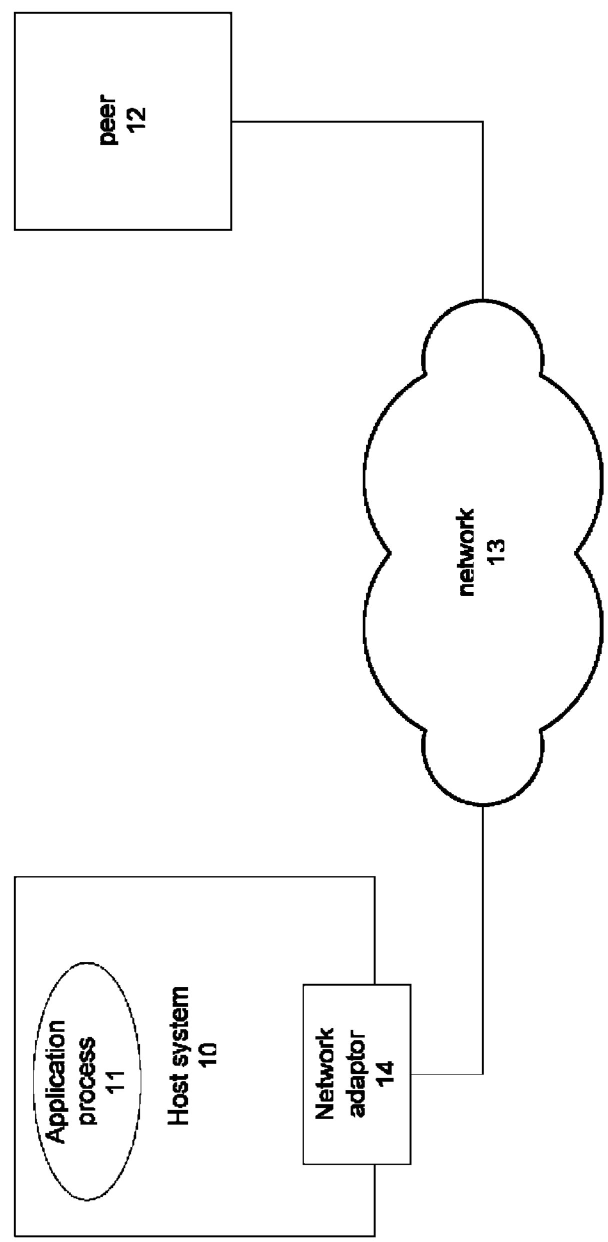
FIG. 1 illustrates a host system with an intelligent network adaptor.

FIG. 1 broadly illustrates a host system 10 running an application process 11, which is communicating to a peer 12 via a network 13. A network adaptor 14 couples the host system 10 to the network.

Generally speaking, network speed increases have not been accompanied by a proportional increase in packet size. As mentioned in the Background, in a high-speed network, the host processor (or processors) may see a high packet arrival rate and a resulting high notification (e.g., interrupt) rate. Handling the notifications can divert a significant part of the host resources away from application processing. Interrupt rate moderation schemes are known, but have limited effectiveness and can introduce delays that may increase communication latency.

Before describing an example of how a payload data destination in the host may be selected, we first discuss more particularly what may be considered a "packet" and how packets may be processed according to one or more protocols. A packet is typically constructed to include application payload data and a sequence of headers (at least one header). Each header may be encapsulated in a lower layer header. The lowest layer is typically called the Media Access Control (MAC) layer (e.g., under a generalized ISO 7-layer model), though other identifiers may be used. A MAC packet is usually called a frame, and includes a MAC header, payload bytes and a trailer. An example MAC layer protocol is Ethernet. An upper layer protocol packet is typically encapsulated in a MAC frame. In the context of the Internet, a common protocol encapsulated in a MAC frame is the Internet Protocol (IP). Another common protocol encapsulated in the MAC frame is the Address Resolution Protocol (ARP). A higher layer (transport layer) packet, such as a TCP or a UDP packet, is typically encapsulated in an IP packet.

Processing of packets received from the network includes protocol processing of the packets based at least in part on the sequence of headers. Connection oriented protocols typically maintain state to be used in protocol processing at the communicating endpoints. Protocol processing is typically carried out before application payload is delivered to the appropriate destination application or applications. Protocol processing in the context of high-speed networks may use significant resources. It is now common for network adaptors to implement intelligence for the support of host processing, including to partly or completely offload protocol processing. Such adaptors are sometimes referred to as intelligent network adaptors.

A highly desirable capability of an intelligent network adaptor is the capability to place application data directly into pre-determined memory locations. For example, these locations may be in host memory or in memory of another adaptor. Direct data placement can significantly reduce the memory bandwidth used for delivery of data received via network communication. In particular, direct data placement may allow placing data directly into application buffers from the intelligent network adaptor, thereby avoiding the copying of packet payload from operating system network buffers to application buffers. This capability is typically referred to as "zero-copy." In addition to saving CPU cycles, the omission of the data copy also saves on application end-to-end latency, as "store-and-forward" memory copies introduce a delay in the end-to-end communication of the application data.

Broadly speaking, applications may differ in their interaction with the host operating system's network protocol processing stack interface. This difference may in part be dependent on the operating system that implements the network protocol processing stack software. To achieve zero-copy data transfer to application buffers, an application typically provides a destination buffer into which the adaptor can directly place application payload data of packets received from the network. Conceptually, an application buffer may include one or a chain of memory locations, each described by a memory address and a length. Typically, it is a network adaptor device driver of the host operating system that handles mapping between the application buffer and descriptors of the chain of memory locations.

Benefits of zero-copy may depend on the size of the buffer provided by the application, and the expediency that an application wishes to get data. For example, there may be a tradeoff between the cost of copying packet payload (e.g., from an operating system buffer to an application buffer) and overhead cost associated with mapping an application buffer into a chain of memory descriptors (for zero copy). The tradeoff involves latency, i.e. having the data wait in the adaptor memory while the mapping is being created, rather than receiving packets through the operating system buffers, while simultaneously setting up memory maps to enable the zero-copy receive of data directly to the application buffers. The mapping typically involves communicating with the host operating system to reserve (referred to as pinning) memory in the host machine that is to receive the zero-copy application data.

The mapping process further includes communicating the mapping to the network adaptor. A standard Ethernet frame carries 1500 B of data, and the mapping is created when the first frame arrives, and if the overall transfer size is only on the order of say 8000 B, and data is being received for a single connection than it is likely that the overhead of zero-copy will be greater than receiving the packets through operating system buffers. When multiple connections are receiving data simultaneously then zero-copy is more efficient even for smaller transfer sizes, because while the mapping is being created for one connection, it is possible that data is being received with zero-copy mechanism for other connections.

Benefits of direct data placement can depend on the application's ability to post buffers and the traffic pattern. Direct data placement to an application buffer is possible if the application has posted a buffer when the application data arrives from the wire and is to be written from the network adaptor to the host. Some application programming interfaces, such as the widely adopted synchronous sockets interface, allow the application to post only one buffer. In such a case, once that buffer is completed and returned to the application, additional incoming application data for the input request can not be directly placed. Thus, for example, the additional incoming data can be stored in memory of the network adaptor and later directly placed when the application posts the next read, or the incoming application data can be placed (e.g., by DMA) to an operating system buffer. In the latter case, when an application buffer is available (e.g., the application posts another buffer), the application data would then be copied from the operating system buffer to the application buffer.

In general, the amount of data that is placed in an operating system buffer is limited if an application buffer becomes available in a timely manner. In addition, copying from the operating system buffer to the application buffer can be done in parallel with the network adaptor operating to cause additional incoming application data to be placed into the same application buffer (e.g., if the application buffer is posted by an application only after the network adaptor already receives application data for that application). Thus, for example, the application data copied from the operating system buffer to the application buffer may be placed at the beginning of the application buffer while the additional incoming application data is placed into the same application buffer at an offset, to account for the data that was previously placed into the operating system buffer.

An intelligent network adaptor may be provided to offload the processing of the stack of headers of the packets. Furthermore, the intelligent network adaptor may be configured so as to reduce the notification rate according to the transport protocol, with minimal or no application level delays being introduced.

In one example, the copy vs. zero-copy decision may be addressed (e.g., in a driver program that interoperates with or is part of the operating system of the host) by using an adaptive scheme that selectively performs one or the other depending on various criteria. For example, a decision may be based in part on, or indirectly result from, the size of the application buffer. This scheme may be transparent to applications so as to not require any application modification or awareness. We refer to this scheme as the "adaptive copy avoidance" scheme. In addition, data may be directly transferred to application space. Applications can make use of this method for highly efficient, flexible, high-speed, very low latency communication. We refer to this as the "memory mapped receive" scheme.

For the purpose of illustration in this description, we refer to applications that use the Transmission Control Protocol (TCP) to communicate over an Internet Protocol (IP) network. The description herein serves the purpose of illustrating the process of application data delivery over a network, and it is not intended to be construed as limiting the applicability of the described methods and systems to this particular described context.

TCP provides a reliable data stream delivery service. TCP is a connection-oriented protocol according to which a stateful association is established between two communicating end-points such as between an application, executing in a host, and a peer located across a network from the host. In this context, each packet may include a 4-tuple designating a destination IP address, a source IP address, a destination TCP port number and a source TCP port number, to uniquely identify a connection. An intelligent network adaptor configured to offload the processing of the TCP/IP protocol stack from a host is typically referred to as a TCP Offload Engine (TOE).

Figure 2:
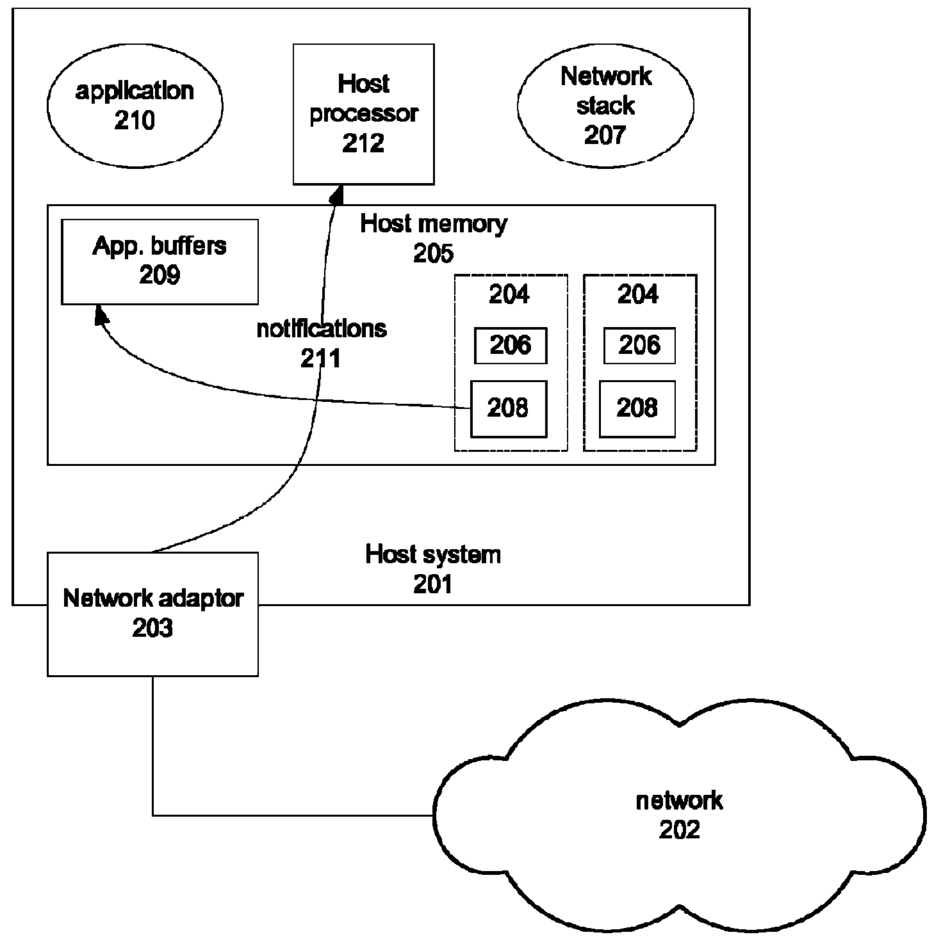
FIG. 2 illustrates data delivery by an ordinary network adaptor.

FIG. 2 broadly illustrates an example of conventional payload delivery in a host system 201 using TCP/IP to receive data over a network 202 from a peer (not shown) by means of a network adaptor 203. FIG. 2 shows packets 204 that have been delivered to host memory 205 (typically in operating system memory). The headers 206 are processed by the network stack 207, and the payload 208 is copied from its location in host memory 205 to application buffers 209 associated with an application 210 (also in host memory). Payload arrival notifications 211 are sent by the network adaptor 203 to a host processor 212 so that the application 210 can be made aware that application data is "ready" in the application buffers 209.

Figure 3:
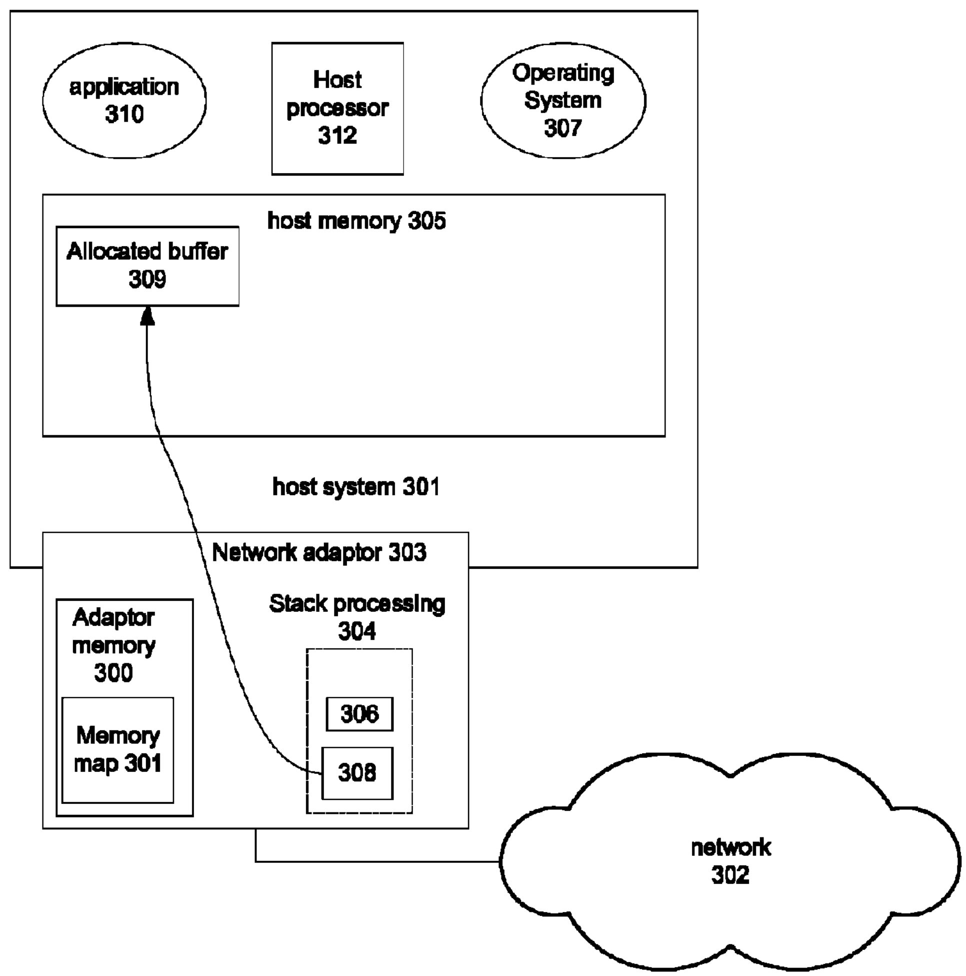
FIG. 3 illustrates data delivery by an intelligent network adaptor capable of performing direct data placement according to the present invention.

In contrast to the conventional payload delivery described with respect to FIG. 2, FIG. 3 broadly illustrates payload delivery with notification rate moderation and with adaptive copy avoidance. The intelligent network adaptor 303 receives the packets 304 from the network 302 via a TCP connection, performing protocol processing in some form to process the headers 306 and extract the application payload 308. The application payload is directly placed in host memory 309 according to memory descriptors of a memory map 301 associated with the TCP connection via which the packets 304 are received, available in adaptor memory 300.

The adaptor may moderate the rate of providing payload data arrival notifications by, for example, only generating a payload arrival notification to the host processor 312 if the incoming packet is determined by the adaptor to contain useful application level notifications. Whether an incoming packet contains useful application level notifications may be determined, for example, by processing the application payload in the intelligent network adaptor, from signaling according to the transport protocol in the protocol header, or from the level of data in an application level buffer (e.g., the application level buffer is full or nearly full). With respect to signaling according to the transport protocol, in a TCP/IP context, TCP may carry signaling that may loosely be considered application level signaling in the TCP header control flags, such as the FIN, URG and PSH flags. The FIN flag indicates that the sender/peer has finished sending data. The URG flag indicates that the Urgent pointer is set (indicating that the payload data should reach the host quickly). The PSH flag indicates that a segment should be passed to the application as soon as possible.

In this example, the memory location for direct placement of application payload data may be dependent on the adaptive copy avoidance scheme. According to the scheme, if zero-copy is to be used, the application buffer descriptors have been communicated to the adaptor from the host and, based on this, the intelligent network adaptor operates to directly place payload in the application buffer according to the descriptors. Otherwise, application buffer descriptors have not been communicated to the adaptor, and application payload is placed in a memory location not corresponding to an application buffer, such as, for example, in a memory location corresponding to an operating system network adaptor buffer, for subsequent copying into an application buffer.

We now describe a specific example of data delivery according to an example of the adaptive copy avoidance scheme, with reference to FIG. 3. In particular, we describe conditions under which the application buffer descriptors may be communicated to the adaptor from the host. When an Ethernet packet is received from the network 302 by the adaptor 303, the Ethernet packet is processed by the adaptor 303. If the processing results in identifying a specific TCP connection state within the adaptor 303 (i.e., the packet is for a TCP connection being handled by the adaptor), the packet is further processed within the adaptor according to the TCP/IP protocol. As a result of the processing, it may be determined that the packet contains application payload data, at least a part of which may be acceptable according to the TCP protocol. For application payload data that is acceptable according to the TCP protocol, the intelligent adaptor may proceed to place at least part of the acceptable application payload data into a destination memory 309 of the host—application buffer memory or, for example, operating system memory.

We now particularly discuss operation of the host, with respect to the application, affecting whether buffer descriptors corresponding to application buffer memory are communicated to the intelligent network adaptor (or the intelligent network adaptor is otherwise configured for zero copy with respect to the application). For example, an application may perform input/output (I/O) data transfer operations by presenting a memory buffer to the operating system 307 to/from which data transfer is to occur. One criterion for deciding whether to configure the intelligent network adaptor for performing zero-copy for a data receive I/O operation may be the buffer size passed by the application relative to the size of a copy source buffer that would otherwise be used. As mentioned earlier, if the size of the application buffer is relatively small, the overhead involved in setting up a zero-copy operation can become a significant portion of the operation.

In this case, a copy operation may be more advantageous, particularly when the source buffer of the copy operation (i.e., if the copy operation is to be used) is larger than the size of the application buffer. Then, it may result that data transfer occurs from the adaptor to a copy source buffer in the host memory. The copy source buffer is typically (but need not necessarily be) in memory controlled by the operating system 307. The data in the copy source buffer (written from the adaptor) can be subsequently copied to the application buffer 309. If the size of the application buffer is relatively larger, the I/O operation can be expected to be relatively longer, and it can be worthwhile to expend the overhead to set up a zero copy operation based on the expected efficiencies gained in carrying out the zero copy operation.

Another criterion for determining whether to perform zero copy may be whether the application buffer sizes are large enough relative to the amount of application data being received for zero copy to be "useful" such as, for example, to reduce data transfer overhead (in contrast to increasing zero copy setup overhead). When the application buffer sizes are "sufficiently large" for zero-copy to be useful (for example, there is enough room in the application buffer to accommodate all the data of a particular transfer from the intelligent network adaptor to the application), an indication of the memory locations corresponding to the application buffer are communicated to the intelligent network adaptor. For example, this communication of memory location indications may be initiated by operating system drivers associated with the intelligent network adaptor. The intelligent network adaptor can then place incoming data directly into the application buffer based on the indications of memory locations.

In some cases, after requesting an input (receive, read) operation, an application waits for the operation to complete and then performs some processing on the received data before proceeding to request another receive operation. This is typically referred to as "synchronous I/O". Data that arrives during the time the application has no receive request in place may be saved in some memory—either in memory of the intelligent network adaptor or in host memory (e.g., in memory controlled by the operating system). In this case, the operating system buffer described above (the copy source buffer) can be used to save the received data. This helps minimize idle times and delays and allows for a network adaptor design with less memory and less likelihood to need to drop received packets.

When an application makes a receive request and the operating system buffer contains saved data, the data may be copied from the operating system buffer to the application buffer. Furthermore, if the application buffer is large enough to hold all the saved data, the application buffer information may be communicated to the intelligent adaptor. Then, the adaptor can start placing additional received data of the request in the application buffer at an offset based on the data previously placed in the operating system buffer. The operating system can independently and simultaneously copy the saved data into the application buffer. This approach has an advantage that latency of the data transfer may be minimized in that data may be copied to the application buffers via the operating system buffers as soon as the data is requested by the application and, simultaneously, the operating system interoperates with the adaptor to cause the adaptor to be configured with the mapping information so that subsequent data can be placed directly in the application buffers with zero-copy.

Some applications may be capable of placing multiple receive requests. Such applications can process data received corresponding to one request (and, for example, in one request buffer) while, simultaneously, data received corresponding to another request can be placed into another buffer. This is sometimes referred to as "asynchronous I/O". Such applications may be capable of ensuring that at least one receive request is in place at all times, and therefore may operate without needing an operating system buffer to handle the "no receive request" case as described above. When the adaptor completes transfer to one application buffer, the host system is notified, and subsequent data can be placed in another application buffer (such as in the following application buffer in sequence). A driver associated with the intelligent network adaptor may control where incoming data is placed. For example, the adaptor may simply pin and map the application buffer memory for direct memory access of application payload data from the intelligent network adaptor to the host.

In accordance with another aspect, an intelligent reduction in notification rate regarding data received from the network and provided from the intelligent network adaptor to an application buffer memory of the host or a copy source buffer of the host may improve host system performance without affecting (or with minimal effect on) communication latency. The notification rate for the data transfer process to the copy source buffer may be moderated by the intelligent network adaptor to be on a greater than per-packet basis to reduce host system processing load to respond to the notifications. Accordingly, data transfer for a connection from the intelligent network adaptor to the host system may be performed "silently" without any data transfer notification to the host system, for example, until such a notification is deemed useful. Useful notifications may correspond to events occurring at the application layer, determined by the intelligent network adapter through processing the application layer information. Other useful notifications may correspond, for example, to events occurring at a layer lower than the application layer, such as at the transport layer. For example, useful data notifications may correspond to the receipt and detection, by the intelligent network adaptor from the network, of a special TCP control flag, such as the PSH flag, the URG flag, or the FIN flag for the connection. A different type of notification may be sent when a non-graceful teardown of the connection occurs, such as receipt of a valid RST flag or other abortive events.

It is useful in some situations to provide data transfer notifications from the intelligent network adaptor to the host on the basis of elapsed time, such as on a periodic basis, or when the memory buffer in use is filled up, or when a timer elapses since the last data had been silently placed. These measures help to allow the application processing to proceed at a steady rate, and forward progress when the last data has arrived. The first of these (elapsed time, such as periodic basis) is useful in the cases where the data is arriving slowly, as it can assist the application in getting an opportunity to process the data at a steady rate with acceptable latency. The second (when the memory buffer in use is filled up) assists the application in processing at a steady rate and/or the application can process data while new data is arriving (pipelining). The last of these (timer elapses since the last data had been silently placed) applied at least to the "end of data" case, i.e. no more data is forthcoming and a timer ensures that the application makes forward progress in processing the application data.

A flow control scheme can be established for use with direct data placement functionality (whether in accordance with the adaptive copy scheme discussed above or otherwise). In an example implementation, a number of data credits are provided to the intelligent network adaptor. The credits may correspond to an amount of data received. When the intelligent network adaptor buffers the data itself (e.g., because the data cannot be delivered on-the-fly to the host for some reason), the receive window being advertised to the peer is shortened (e.g., by the number of bytes that are buffered by the adaptor). When the data is eventually placed on the host, then the advertised receive window is lengthened (e.g., by the number of bytes that are placed). If the data placed on the host cannot be directly placed to an application buffer (e.g., is held in a "common pool" of buffers), then the receive window is accordingly shortened, and when the data is eventually delivered to the application, the receive window is again lengthened.

Conversely, when the application consumes data and application buffer becomes available, the credits are returned to the intelligent network adaptor, and its credit count incremented accordingly. If the TCP window flow control is made dependent on this flow control scheme, such as by basing the TCP window size on the number of credits available to the intelligent network adaptor, it is possible to perform end-to-end flow control with the application as terminus, as opposed to with the intelligent network adaptor or operating system buffers as terminus. One benefit of this arrangement may be that less memory may be used in the intelligent network adaptor, since flow control is based on the available memory in the host for the application and is not based on (or, at least, is not based completely on) the available memory in the intelligent network adaptor.

We now move to discuss an example of a method for managing the transfer to application memory space. The method allows high bandwidth and low latency, at low host system load. It may allow applications executing on the host to perform random access to the received data in application memory.

Figure 4:
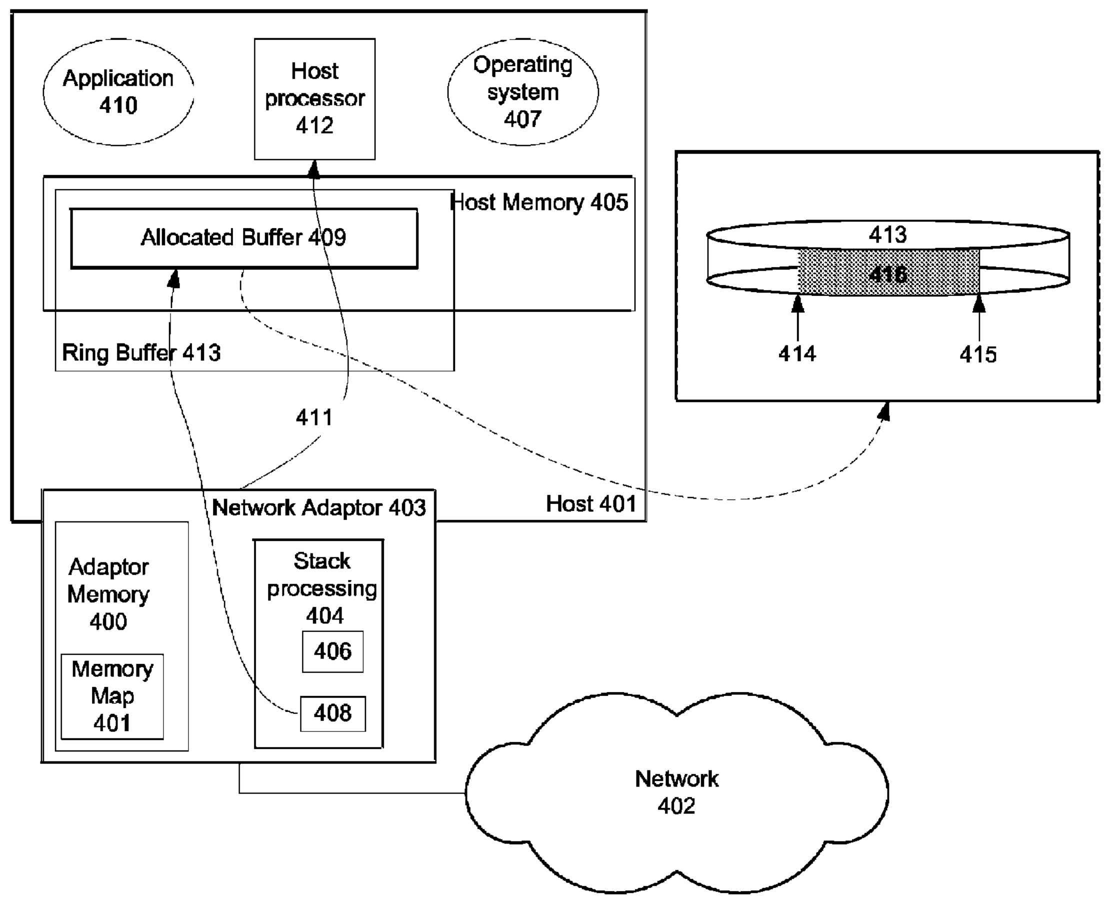
FIG. 4 illustrates a buffer handling scheme in host memory.

Referring to FIG. 4, in an example implementation of this method, an application 410 running in a host 401 is capable of allocating a portion of its memory space 413 as a buffer 409 for receive operations. The location of the allocated buffer 409 is pinned in host memory 405, memory mapped by the operating system 407. The memory map is communicated to the intelligent network adaptor 403. The intelligent network adaptor 403 stores the memory map 401 in its on-board memory 400. Data received by the intelligent network adaptor from the network, in a connection for the application, are placed into the buffer 409. The notification rate to the host may be moderated, as discussed above for example. When a notification 411 is provided to the host by the intelligent network adaptor 403, the notification may first be received by the operating system and in turn passed to the application. The notifications serve to inform the application of the progress of the receive operation.

The intelligent network adaptor may place received out-of-order data directly in the buffer 409, and therefore perform data re-assembly in the buffer 409 itself, e.g., if the data is received out-of-order in accordance with an applicable transport protocol for the connection. In this case the adaptor keeps track of which data has already been placed in the application buffer, and which data is still to be delivered, and notifies the application when all the data has been placed, or in case of a delivery timer expiring, how much of the in-order data at the start of the buffer has been delivered. Alternatively, out-of-order data re-assembly may be performed in a different memory location (e.g., in adaptor memory), with only in-order data being placed in the buffer 409. In either case, the progress of the receive operation may be indicated in terms of the memory address containing the latest byte received in-order. Payload data of at least some of the packets can, after being reordered spatially, be considered to comprise payload data of an equivalent newly-configured packet. In this case, the peer may be provided an acknowledgement of the equivalent newly-configured packet.

A flow control scheme may be used to control the amount of data provided to the host. For the sake of illustration, we now discuss an example of the flow control in more detail. In one example, byte granularity flow control is performed on an end-to-end basis by assigning a total amount of flow control credit equal to the size of the mapped receive memory. As one example, TCP allows up to 1 GB of memory to be used for flow control. An even larger receive memory can be utilized by dividing the receive memory into smaller sized “windows” and proceeding through the windows in sequence, i.e. by moving forward the window into the buffer on which the adaptor is working as the buffer gets filled by the adaptor. In this manner, it is possible to expose 1 GB of memory at a time, and to move through a large memory area by “sliding” the exposed receive window as the data placement progresses.

For each amount of data placed by the adaptor, a corresponding number of units of credit are consumed by the adaptor. The consumed credits are subsequently reflected in the flow control window (by contraction of the window) advertised to the sending peer. Conversely, when the application processes a number of bytes, a corresponding number of units of credits can be returned to the adaptor. The returned credits are subsequently reflected in the flow control window (by expansion of the window) advertised to the sending peer. This scheme allows flow control to be performed directly in terms of receiving application space.

Note that when the placement reaches the end of the mapped memory region, the adaptor can resume placing at the beginning of the memory region, if flow control allows. It is therefore possible to visualize the operation as a ring buffer 413 with a producer pointer 414 corresponding to the latest byte placed in-order by the adaptor, and a consumer pointer 415 corresponding to the last byte consumed by the application. The region 416 in between the consumer pointer and the producer pointer contains received data bytes that can be accessed in random order. The application moves the consumer pointer forward to a new location along the ring when work has been completed on (i.e. consumed) the bytes that fall behind the new pointer location. The number of credits in possession of the adaptor determines the number of bytes that the adaptor is allowed to place on the ring in advance of the producer pointer. A goal of proper flow control is to avoid the producer pointer from crossing over the consumer pointer. In some examples, the producer pointer is not moved every time data is placed. Rather, the producer pointer may be moved when a notification of progress is received, and the notification of progress may be moderated by the intelligent network adaptor to minimize the communication between the intelligent network adaptor and the host. Likewise, in returning credits to the intelligent network adaptor, credits may be accumulated and sent to the intelligent network adaptor as a group, which can minimize the number of update messages being communicated.

It is possible to obtain very low latency operation using the memory mapped scheme. In this approach, an application or other host software may interpret a change in the contents of a particular memory location as an indication that new in-order data has become available in the receive buffer. In one example, the change in the contents of the particular memory location may be serialized with respect to the arrived data. In one example, the memory location could be ahead of the last byte of arrived data on the ring buffer, and the data placement by the intelligent network adaptor is guaranteed to be in-order, i.e. without “skips”. By polling such a memory location, the application is informed of the arrival of new data with very low delay.

By intelligently handling transfer of data between an intelligent network adaptor and a host, efficiency and efficacy of peer to host communication can be substantially increased.

What is claimed is:

1. A method of operating an intelligent network adaptor that couples a host to a network, the host executing an application configured to receive data packets, including application data, from a peer via the network and the intelligent network adaptor using a stateful connection between the host and the peer according to a connection-oriented protocol, wherein the intelligent network adaptor performs protocol processing of the connection, the method comprising:

by the intelligent network adaptor, performing protocol processing for the connection with the peer to, at least in part, obtain the application data from the data packets received from the peer, including indicating a receive window to the peer;

placing application data, received from the peer via the stateful connection, from the intelligent network adaptor directly to host memory application buffer associated with the application without the application data being first provided from the intelligent network adaptor to host memory buffer associated with a host operating system and not specifically with the application; and causing the indicated receive window to be increased based on the application buffer becoming available due to the application consuming application data from the application buffer.

2. The method of claim 1, further comprising:

causing the indicated receive window to be reduced based on the application data being placed in the host memory application buffer by the intelligent network adaptor.

3. The method of claim 1, further comprising:

by the intelligent network adaptor, generating the receive window indication, including maintaining an indication of receive window credits based on an amount of the application data placed from the intelligent network adaptor to host memory application buffer and further based on the application data in the host memory application buffer being consumed by the application.

4. The method of claim 1, further comprising:

placing application data, received from the peer via the stateful connection, from the intelligent network adaptor to the host memory buffer associated with the operating system and not specifically with the application and, based thereon, causing the indicated receive window to be reduced.

5. A method of operating an intelligent network adaptor that couples a host to a network, the host executing an application configured to receive data packets, including application data from a peer via the network and the intelligent network adaptor using a stateful connection between the host and the peer according to a connection-oriented protocol, wherein the intelligent network adaptor performs protocol processing of the connection, the method comprising:

by the intelligent network adaptor, performing protocol processing for the connection with the peer to, at least in part, obtain the application data from the data packets received from the peer, including providing a receive window to the peer;

placing application data, received from the peer via the stateful connection, from the intelligent network adaptor directly to host memory application buffer associated with the application without the application data being first provided from the intelligent network adaptor to host memory buffer associated with a host operating system and not specifically with the application; and receiving, from the host, an indication that the application has consumed application data from the host memory application buffer associated with the application; and generating the receive window based at least in part on the received indications of consumption of the application data from the host memory application buffer, wherein the host memory application buffer is larger than an amount of memory allowed by the connection-oriented protocol for flow control; and the host is configured to expose to the interface adaptor, for use with the connection at any particular time, a portion of the host memory application buffer that is no larger than the amount of memory allowed by the connection-oriented protocol for flow control.

6. The method of claim 5, wherein:

the host maintains the host memory application buffer as a ring structure.

7. The method of claim 5, wherein:

the host maintains the host memory application buffer as a plurality of overlapping windows into the host memory application buffer, each window no larger than the amount of memory allowed by the connection-oriented protocol for flow control; and the host selectively exposes to the interface adaptor one of the windows at any particular time.

8. The method of claim 7, wherein:

maintaining the host memory application buffer as a plurality of overlapping windows includes maintaining the host memory application buffer as a ring structure, including maintaining producer and consumer pointers into a currently-exposed window, including advancing the producer pointer based on in-order application data being placed in the host memory application buffer and advancing the consumer pointer based on application data being consumed by the application from the host memory application buffer.

9. The method of claim 8, wherein:

maintaining the host memory application buffer as a plurality of overlapping windows includes, as the consumer pointer is advanced based on consumption of application data by the application, releasing credits corresponding to the connection from the host to the intelligent network adaptor; and the intelligent network adaptor generates the receive window for the connection based at least in part on the released credits.

10. The method of claim 9, wherein:

releasing credits corresponding to the connection from the host to the intelligent network adaptor includes accumulating credits corresponding to the connection and bunching the release of accumulated credits from the host to the intelligent network adaptor.

11. The method of claim 8, wherein:

advancing the producer pointer based on in-order application data being placed in the host memory application buffer includes the intelligent network adaptor accumulating notifications to the host of application data being placed in the host memory application buffer to moderate the notifications being provided to the host.

12. The method of claim 7, wherein:

maintaining the producer and consumer pointers into the currently-exposed window includes constraining the producer pointer from being advanced only as far as the one-window's worth of memory away from the consumer pointer.

13. The method of claim 8, wherein:

maintaining the host memory application buffer as a plurality of overlapping windows includes, as the producer pointer is advanced based on placing of application data by the intelligent network adaptor, decrementing receive windows credits corresponding to the connection; and the intelligent network adaptor generates the receive window based at least in part on receive window credits corresponding to the connection.

14. The method of claim 7, wherein:

the application data placing includes placing the application data, in time, substantially in the order received by the intelligent network adaptor, reordered spatially in the host memory application buffer from the order received by the intelligent network adaptor, to account for temporally out-of-order receipt by the intelligent network adaptor.

* * * * *